Figure 1:
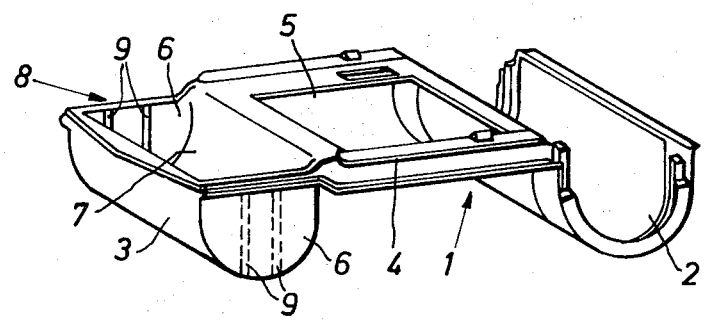

United States Patent
Wiesner et al.

[15] 3,653,604
[45] Apr. 4, 1972

[54] PHOTOGRAPHIC FILM CASSETTE

[72] Inventors: Max Wiesner, Leverkusen; Herbert Sonne, Leichlingen; Hans-Robert Schmidt, Cologne, all of Germany

[73] Assignee: AGFA-Gevaert Aktiengesellschaft, Leverkusen, Germany

[22] Filed: Dec. 2, 1969

[21] Appl. No.: 881,540

[30] Foreign Application Priority Data

Jan. 8, 1969 Germany..........................G 69 00 514

[52] U.S. Cl.............................................................242/71.2
[51] Int. Cl...............................................................G03b 17/26
[58] Field of Search................242/71, 71.1, 71.2, 71.4, 74.1, 242/199, 57, 75.4

[56] References Cited

UNITED STATES PATENTS

| | | | |
|---|---|---|---|
| 2,731,894 | 1/1956 | Leitz et al. | 242/71.1 X |
| 3,495,787 | 2/1970 | Wallace | 242/74.1 X |

*Primary Examiner*—George F. Mautz
*Assistant Examiner*—Gregory A. Walters
*Attorney*—Connolly and Hutz

[57] ABSTRACT

An improvement of a photographic film cassette, which is of the type having a takeup section and supply section, and brake elements which act on the lateral surface of the film coil arranged at the supply chamber. The brake elements are formed of ribs which are in one piece with the housing and bear under tension against the side surfaces of the film roll. The ribs are arranged perpendicular to the separation plane of the cassette.

4 Claims, 2 Drawing Figures

PATENTED APR 4 1972          3,653,604

INVENTORS:
MAX WIESNER, HERBERT BOHNE, HANS-ROBERT SCHMIDT.
BY
Their Attorneys

PHOTOGRAPHIC FILM CASSETTE

The present improvement relates to a photographic film cassette for loading into photographic apparatus. The cassette is of the type having a take-up section and supply section, and brake elements which act on the lateral surface of the film coil arranged at the supply chamber.

The purpose of such film cassettes is to allow rapid changing of the film without the hitherto usual loading of the roll film by hand.

It is of course already known in connection with photographic apparatus to brake the roll of film by springs bearing on the circumference of the roll, in order to prevent any loosening action. However, the danger exists in these cases that either an increased pressure is exerted by means of the springs on the circumference of the film roll while the latter is still full, so that possible damage to the film can occur, or alternatively, when the roll has already been unwound to a relatively great extent, the spring tension is no longer sufficient to prevent a loosening effect.

It has now been found that these disadvantages can be avoided by the brake elements being formed of ribs which are integral with the housing and which bear under tension against the lateral surfaces of the roll.

The effect hereby obtained is that the braking force does not act on the circumference of the film roll, but acts on its lateral surface.

The ribs are advantageously arranged perpendicular to the separation plane of the cassette, so that very easy removal from the mould of the cassette halves at the time of their manufacture is assured, for example, by an injection moulding or deep-drawing process.

It has proved to be particularly advantageous to construct these ribs so that they taper towards the separation plane. In this way, an even easier removal of the cassette halves from the mould is possible, since any existing tensions or an adhesion of the rib surface with the mould is immediately and automatically eliminated.

As an alternative to vertically arranged ribs, the ribs can be arranged radially in accordance with another embodiment of the invention.

The constructional forms according to the improvement have the advantage that it is possible, in a single working step, without any separate and additionally applied brake elements for the film roll, to provide an arrangement which, by appropriate regard to the dimensions of the spool and the internal width of the supply chamber, provide a braking action which is of constant strength of the film roll throughout the entire unwinding operation.

The improvement is now to be more fully explained by reference to two constructional examples shown in a drawing:

FIG. 1 shows a film cassette 1 with a take-up section 2 and a supply or unwinding section 3 and the intermediate member 4, which has an aperture 5. Arranged on inner end walls 6 of an unwinding chamber 7, are ribs 9 which are disposed perpendicular to the separation plane 8 of the film cassette 1.

Figure 2:
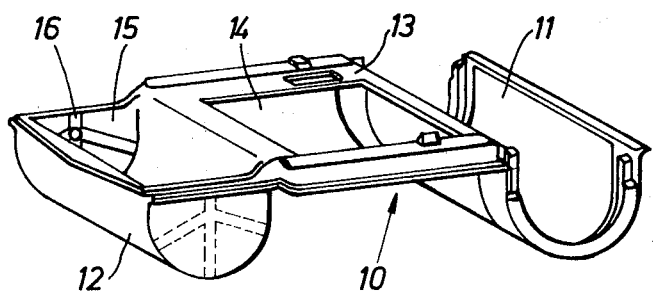

In FIG. 2, the film cassette 10 consists of the take-up section 11 and the supply or unwinding section 12, as well as the intermediate section 13 with the aperture 14. Provided on the inner surfaces of the side walls 15 of the unwinding section 12 are radially arranged ribs 16 which, in conjunction with the side walls, exert a braking force on the film roll which is to be loaded.

We claim:

1. A photographic film cassette for loading a film roll having a film coil and end surfaces in photographic apparatus, the cassette comprising a take-up section and a supply section having cylindrical side walls and substantially flat end walls having inner surfaces, said film roll being insertable in said supply section between said end walls the distance between the inner surfaces of the end walls being slightly greater than the distance between the end surfaces of the film roll whereby a slight clearance is provided between the end surfaces of the film roll and the end walls of the supply section, brake elements for acting on the film roll being arranged on the supply section, said brake elements being ribs disposed upon the inner surfaces of said substantially flat end walls of said supply section, the distance between the ribs on opposite end walls being slightly less than the distance between the end surfaces of the film roll whereby the ribs are caused to bear under tension against the end surfaces of the film roll whereby a substantially constant braking action is imposed on the film roll throughout its entire unwinding operation without touching the sensitive film coil.

2. A film cassette according to claim 1, wherein said cassette has a separation plane extending through the take-up and supply sections, and the ribs are arranged perpendicular to the separation plane of the cassette.

3. A film cassette according to claim 2, characterized in that the ribs taper towards the separation plane.

4. A film cassette according to claim 1, characterized in that the ribs are arranged radially.

* * * * *